United States Patent
Shirai et al.

[11] Patent Number: 5,905,375
[45] Date of Patent: May 18, 1999

[54] ROTATIONAL SPEED SENSING DEVICE PROVIDED WITH A PAIR OF MAGNETIC MEMBERS EACH HAVING A PLURALITY OF PROJECTIONS

[75] Inventors: Katsuyoshi Shirai, Anjo; Satohiko Nakano, Chiryu, both of Japan

[73] Assignee: Aisin Seiki Kabushiki Kaisha, Kariya, Japan

[21] Appl. No.: 08/624,065

[22] Filed: Mar. 29, 1996

[30] Foreign Application Priority Data

Mar. 30, 1995 [JP] Japan .................................. 7-074245
Dec. 19, 1995 [JP] Japan .................................. 7-330809

[51] Int. Cl.$^6$ .............................. G01P 3/44; G01P 3/488; F16C 41/00
[52] U.S. Cl. ............... 324/174; 324/207.22; 324/207.15; 384/448
[58] Field of Search ................................ 324/173, 174, 324/207.15, 207.22, 207.25; 384/448; 310/68 B, 156, 168

[56] References Cited

U.S. PATENT DOCUMENTS

| | | |
|---|---|---|
| 3,541,368 | 11/1970 | Jones et al. . |
| 5,293,124 | 3/1994 | Caillaut et al. .......................... 324/174 |
| 5,381,090 | 1/1995 | Adler et al. ............................. 324/174 |

FOREIGN PATENT DOCUMENTS

| | | |
|---|---|---|
| 2 424 761 | 5/1974 | European Pat. Off. . |
| 0 426 298 A1 | 5/1991 | European Pat. Off. . |
| 0701 132 A1 | 3/1996 | European Pat. Off. . |
| 0701 133 A1 | 3/1996 | European Pat. Off. . |
| 1 913 468 | 3/1969 | Germany . |
| 5-94771 | 12/1993 | Japan . |
| 1 457 458 | 12/1976 | United Kingdom . |

*Primary Examiner*—Walter E. Snow
*Attorney, Agent, or Firm*—Burns, Doane, Swecker & Mathis, L.L.P.

[57] ABSTRACT

A rotational speed sensing device for sensing a rotational speed of a rotating member includes a pulsar ring having a plurality of wall portions, a permanent magnet, a coil, a first magnetic member and a second magnetic member. The first magnetic member is provided for forming a first magnetic circuit which includes at least the inner side of the coil. The first magnetic member has a plurality of projections that are alternately positionable during rotation of the pulsar ring in a first position in which the projections oppose the wall portions and in a second position in which the projections do not oppose the wall portions while the pulsar ring is rotating. The second magnetic member is provided for forming a second magnetic circuit which does not include the inner side of the coil in such a manner that the magnetic resistance of the second magnetic circuit is lower than the magnetic resistance of the first magnetic circuit when the projections are located in the second position.

20 Claims, 8 Drawing Sheets

ROTATIONAL SPEED SENSING DEVICE PROVIDED WITH A PAIR OF MAGNETIC MEMBERS EACH HAVING A PLURALITY OF PROJECTIONS

FIELD OF THE INVENTION

The present invention relates to a speed sensing device and more particularly to a rotational speed sensing device adapted for use in a wheel speed sensor of an automotive vehicle.

BACKGROUND OF THE INVENTION

A conventional rotational speed sensing device is disclosed in Japanese Utility Model Laid-open publication No. 5(1993)-94771 published without examination on Dec. 24, 1993. The rotational speed sensing device disclosed in this document is illustrated in FIG. 9 and FIG. 10.

As shown in FIG. 9, the rotational speed sensing device includes a pulsar ring 104, a permanent magnet 105, a coil 108 and a magnetic member 106. The pulsar ring 104 is fixed to a rotating member 101 and the rotating member 101 is rotatably supported on a cylindrical member 103 via a plurality of balls 102. The cylindrical member 103 is fixed to a shaft 100. As shown in FIG. 10, the pulsar ring 104 has a plurality of generally equally spaced apart projections 104a, with the projections being disposed in the circumferential direction of the pulsar ring 104.

The permanent magnet 105 is disposed between the pulsar ring 104 and the cylindrical member 103 and is fixed to a housing 111 that is fixed to the cylindrical member 103. The permanent magnet 105 has an N-pole for generating magnetic flux and an S-pole for receiving magnetic flux generated by the N-pole.

The coil 108 is disposed between the pulsar ring 104 and the cylindrical member 103 and is formed around a bobbin 107 that is fixed to the housing 111. The coil 108 substantially opposes the permanent magnet 105 and generates a voltage corresponding to the magnetic flux which passes through the inner circumferential side of the coil 108 in the axial direction of the rotating member 101. One end of the coil 108 is connected to a first terminal 109 and the other end of the coil 108 is connected to a second terminal 110.

The magnetic member 106 is disposed at the inner circumferential side of the coil 108 and is fixed to the housing 111. The magnetic member 106 is provided for forming a magnetic circuit with the permanent magnet 105, the pulsar ring 104 and the inner circumferential side of the coil 108. As shown in FIG. 10, the magnetic member 106 has a plurality of projections 106a corresponding to the projections 104a on the pulsar ring 104. The magnetic member 106 is alternately located relative to the pulsar ring 104 in a first position in which the distance between each projection 106a and each wall portion 104a is relatively small and in a second position in which such distance is relatively large.

The operation of the convention device described above is as follows. When the rotating member 101 is rotated, the pulsar ring 104 rotates with the rotating member 101. Since the magnetic member 106 is alternately positioned relative to the pulsar ring 104 in the first and second positions during this time, the magnetic resistance between each projection 106a of the magnetic member 106 and each projection 104a of the pulsar ring 104 varies, whereby magnetic flux which passes through the inner circumferential side of the coil 108 in the axial direction of the rotating member 101 varies. As a result, the coil 108 generates voltage corresponding to the magnetic flux which passes through the inner circumferential side of the coil 108 and this voltage is picked up by the terminals 109, 110 so that the rotational speed of the rotating member 101 can be detected.

In the above-described device, since the magnetic circuit which includes the inner circumferential side of the coil 108 is only formed by the magnetic member 106 when the magnetic member 106 is located relative to the pulsar ring 104 in the second position, magnetic flux which passes through the inner circumferential side of the coil 108 may be fully decreased during this time. In other words, the difference between the magnetic flux which passes through the inner circumferential side of the coil 108 when the magnetic member 106 is located in the first position relative to the pulsar ring 104 and the magnetic flux which passes through the inner side of the coil 108 when the magnetic member 106 is located relative to the pulsar ring 104 in the second position is relatively small. Thus, the output of the coil 108 is relatively small.

To increase the output of the coil 108, the permanent magnet 105 must be enlarged or the number of turns of the coil 108 must be increased. Unfortunately, this makes the rotational speed sensing device undesirably larger and more expensive.

SUMMARY OF THE INVENTION

A need exists, therefore, for a rotational speed sensing device which addresses at least the foregoing disadvantage and drawbacks of the prior art.

In accordance with one aspect of the present invention, a rotational speed sensing device includes a pulsar ring having a plurality of wall portions, a permanent magnet, a coil, a first magnetic member and a second magnetic member. The first magnetic member possesses a plurality of projections and is adapted to form a first magnetic circuit which includes at least the inner side of the coil. The projections are alternately located relative to the pulsar ring during rotation of the pulsar ring in a first position in which the projections oppose the wall portions of the pulsar ring and in a second position in which the projections do not oppose the wall portions of the pulsar ring. The second magnetic member forms a second magnetic circuit which does not include the inner side of the coil. The magnetic resistance of the second magnetic circuit is lower than the magnetic resistance of the first magnetic circuit when the projections are located relative to the pulsar ring in the second position.

According to another aspect of the present invention, a rotational speed sensing device for sensing rotational speed of a rotating member includes a pulsar ring fixed to the rotating member and having a plurality of equally spaced apart and circumferentially arranged wall portions, a permanent magnet having an N-pole for generating magnetic flux and an S-pole for receiving magnetic flux generated by the N-pole, and a coil disposed adjacent the pulsar ring for generating voltage corresponding to magnetic flux passing through an inner side of the coil in the axial direction of the rotating member. A first magnetic member forms a first magnetic circuit with the permanent magnet, the pulsar ring and the inner side of the coil. The first magnetic member is provided with projections disposed so that during rotation of the pulsar ring, the projections and the pulsar ring are alternately disposed relative to one another in a fist position in which each of a plurality of the projections opposes one of the wall portions of the pulsar ring and in a second position in which each of the plurality of projections is positioned other than in opposing relation to one of the wall portions of the pulsar ring. A second magnetic member forms a second magnetic circuit with the permanent magnet and the pulsar ring in such a manner that a magnetic resistance of the second magnetic circuit is lower than the magnetic resistance of the first magnetic circuit when the projections and plurality of wall portions are located in the second position relative to one another.

In accordance with another aspect of the present invention, a rotational speed sensing device for sensing rotational speed of a rotatable member includes a pulsar ring secured to the rotatable member for rotating with the rotatable member, a permanent magnet having an N-pole for generating magnetic flux and an S-pole for receiving magnetic flux, and a coil disposed adjacent the pulsar ring for generating a voltage corresponding to magnetic flux passing through an inner side of the coil in an axial direction of the rotating member. A first magnetic circuit forming member is positioned on one side of the coil for forming a first magnetic circuit with the permanent magnet, the pulsar ring and the inner side of the coil. The first magnetic circuit forming member includes a plurality of spaced apart projections. A second magnetic circuit forming member is positioned on a side of the coil opposite the first magnetic circuit forming member for forming a second magnetic circuit with the permanent magnet and the pulsar ring. The second magnetic circuit forming member also includes a plurality of spaced apart projections. The projections on the first and second magnetic circuit forming members interact with portions of the pulsar ring so that during rotation of the pulsar ring the position of the pulsar ring relative to the first magnetic circuit forming member alternates between one position in which a magnetic resistance of the second magnetic circuit is lower than a magnetic resistance of the first magnetic circuit and another position in which the magnetic resistance of the second magnetic circuit is greater than the magnetic resistance of the first magnetic circuit.

BRIEF DESCRIPTION OF THE DRAWING FIGURES

The foregoing and additional features of the present invention will become more apparent from the following detailed description considered with reference to the accompanying drawing figures in which like elements are designated by like reference and wherein.

DETAILED DESCRIPTION OF THE PREFERRED EMBODIMENTS

Figure 1:
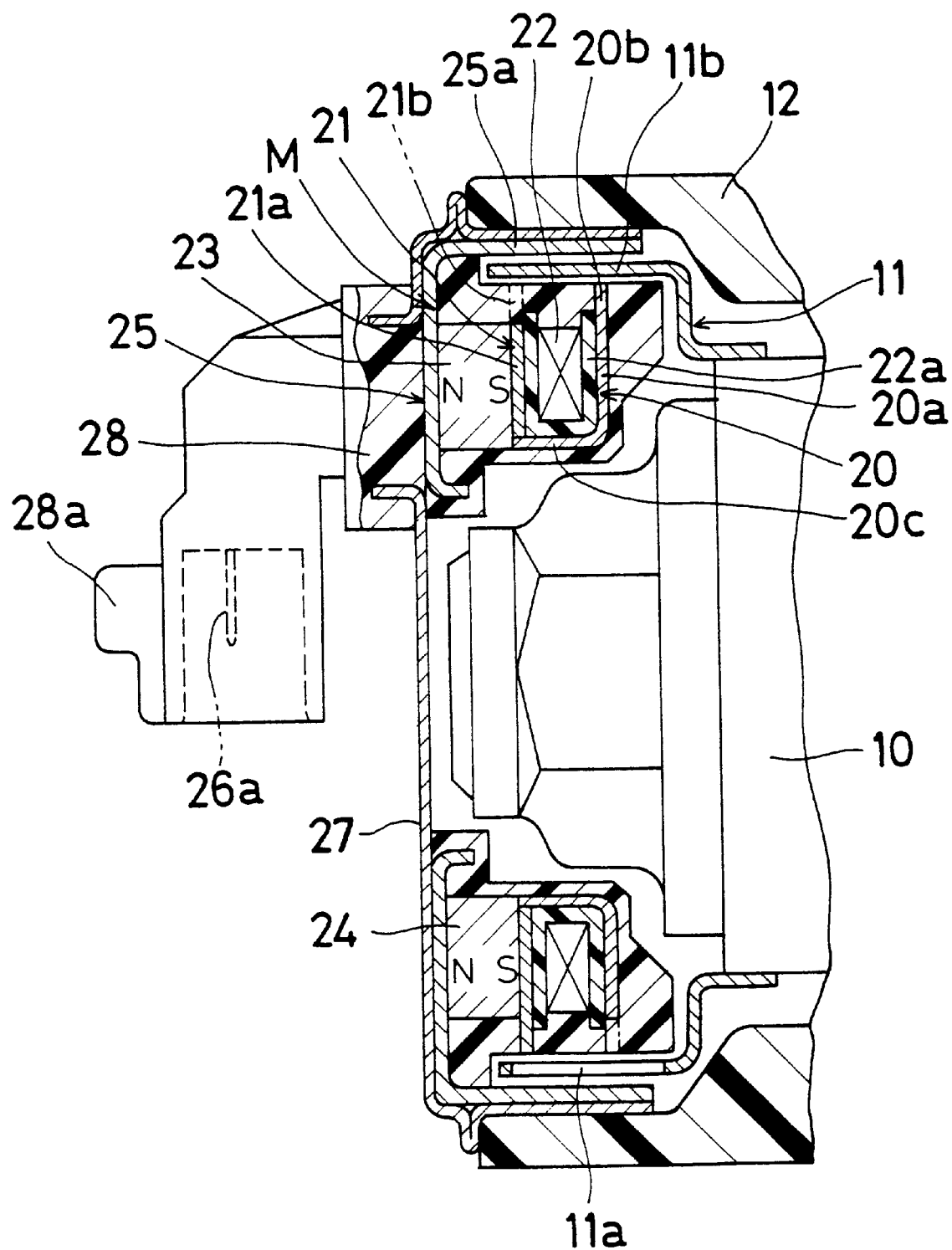
FIG. 1 is a cross-sectional view of a rotational speed sensing device according to a first embodiment of the present invention.

With reference initially to FIGS. 1–5 which illustrate a first embodiment of the invention, the rotational speed sensing device includes a housing 28, a pulsar ring 11, a permanent magnet M, a coil 22, a first magnetic circuit forming member 20, a second magnetic circuit forming member 21, and a yoke 25. The pulsar ring 11, the first magnetic circuit forming member 20, the second magnetic circuit forming member 21 and the yoke 25 are made of magnetic material. The housing 28 is made of resin material and integrally accommodates the pulsar ring 11, the first magnetic circuit forming member 20, the second magnetic circuit forming member 21, and the yoke 25.

Figure 2:
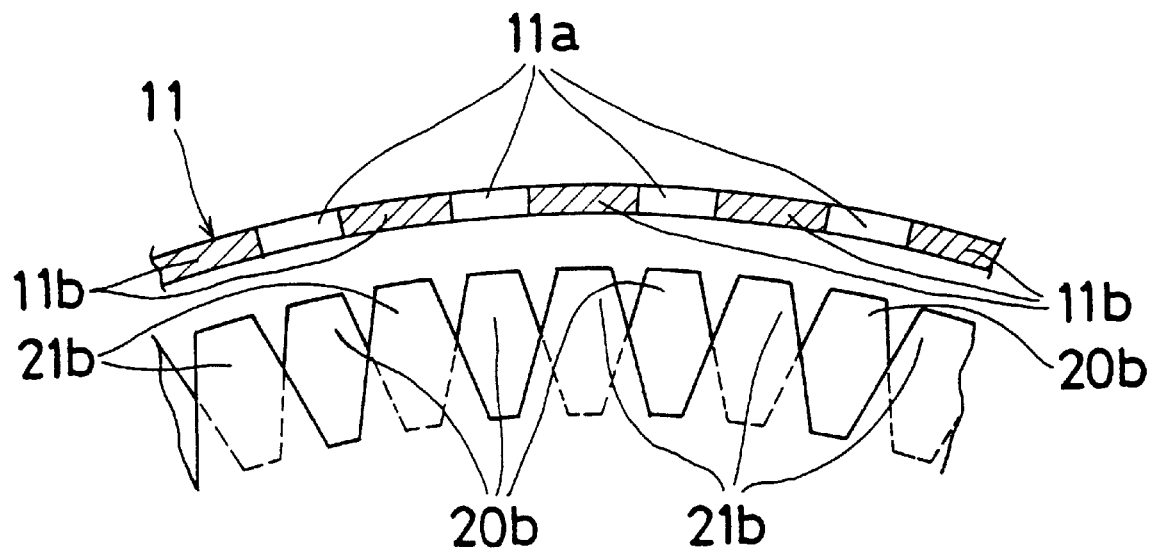
FIG. 2 is an enlarged view of a portion of the device depicted in FIG. 1 showing the relationship between the first and second magnetic circuit forming members and the pulsar ring.

The pulsar ring 11, which is cylindrically shaped, is fixed to the circumferential face of a rotating member 10 such as a drive shaft (not shown) or driven shaft (not shown) of a vehicle. The rotating member 10 is rotatably supported by a hub 12 fixed to the body (not shown) of the vehicle. The housing 28 is fixed to the hub 12 via a mounting member 27. As shown in FIG. 2, the pulsar ring 11 has a plurality of holes 11a and a plurality of wall portions 11b so that the holes 11a and the wall portions 11b are alternately disposed with respect to each other. The holes 11a are disposed at equally spaced apart distances in the circumferential direction of the pulsar ring 11. The pulsar ring 11 may have a plurality of concave portions and a plurality of projections in place of the holes 11a and wall portions 11b.

Figure 3:
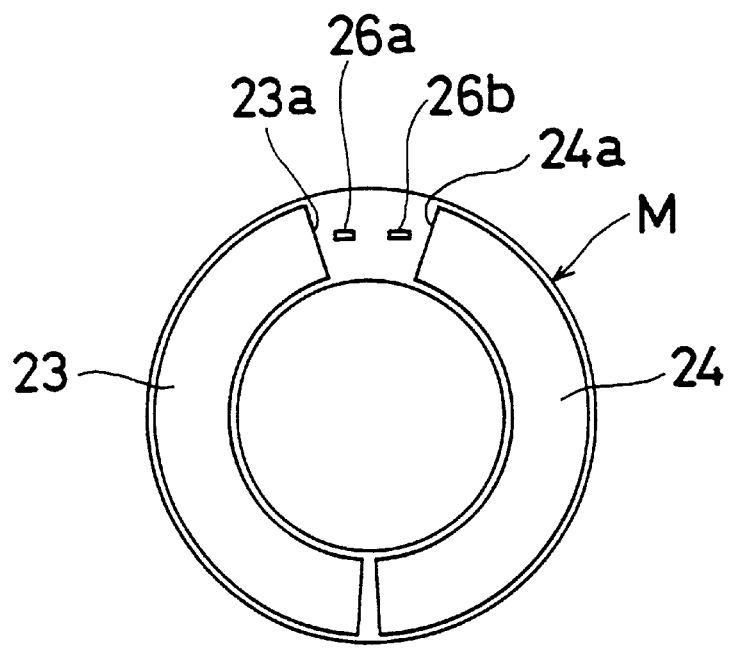
FIG. 3 is a side view of the device shown in FIG. 1 as seen from the left side in FIG. 1.

The permanent magnet M is disposed around the rotating member 10 and has an N-pole for generating magnetic flux and an S-pole for receiving magnetic flux generated by the N-pole. As shown in FIG. 3, the permanent magnet M is defined by a pair of magnet pieces 23, 24 spaced apart from one another in the circumferential direction. The magnet pieces 23, 24 are each shaped like a circular arc and together define almost a complete circle.

The coil 22 is disposed between a portion of the pulsar ring 11 and the rotating member 10 (i.e., the coil 22 is disposed radially inwardly of the free end portion of the pulsar ring 11) and substantially opposes the permanent magnet M. The coil 22 is formed around a bobbin 20b fixed to the housing 28. The coil 22 generates a voltage corresponding to the magnetic flux which passes through the inner circumferential side thereof in the axial direction of the rotating member 10.

One end of the coil 22 is connected to a first terminal 26a and the other end of the coil 22 is connected to a second terminal 26b. The first and second terminals 26a, 26b are provided for picking up an output of the coil 22. As shown in FIG. 3, the terminals 26a, 26b are disposed between one end 23a of one of the magnet pieces 23 and one end 24a of the other magnet piece 24 which opposes the end 23a of the one magnet piece 23. Portions of the terminals 26a, 26b are located in a connector 28a formed integrally with the housing 28.

The first magnetic circuit forming member 20 is disposed between the pulsar ring 11 and the rotating member 10 and is fixed to the housing 28. The first magnetic circuit forming member 20 is adapted to provide a first magnetic circuit (shown in FIG. 4) with the permanent magnet M, the pulsar ring 11 and the inner circumferential side of the coil 22.

The first magnetic circuit forming member 20 has a ring portion 20a, a plurality of teeth 20b and a cylindrical portion 20c. The ring portion 20a is disposed at the right side of the coil 22 in the view shown in FIG. 1. The teeth 20b are formed along the circumferential portion of the ring portion 20a and extend radially outwardly. As shown in FIG. 2, the teeth 20b are disposed at equally spaced apart distances in the circumferential direction of the ring portion 20a. The number of teeth 20b is equal to the number of wall portions 11b on the pulsar ring 11.

During rotation of the pulsar ring 11, each tooth 20b is alternately disposed relative to the pulsar ring 11 in a first position in which each tooth 20b opposes a wall portion 11b of the pulsar ring 11 and in a second position in which each tooth 20b does not oppose a wall portion 11b of the pulsar ring 11. In other words, the magnetic circuit forming member 20 is alternately located relative to the pulsar ring 11 in the first position in which the distance between each tooth 20b and each wall portion 11b is relatively short and in the second position in which such distance is relatively large.

The cylindrical portion 20c of the first magnetic circuit forming member 20 extends from an inner circumferential portion of the ring portion 20a through the inner circumferential side of the coil 22 in the axial direction of the rotating member 10. One end of the cylindrical portion 20c contacts the S-pole of the permanent magnet M.

The second magnetic circuit forming member 21 is disposed between the pulsar ring 11 and the rotating member 10 and is fixed to the housing 28. The second magnetic circuit forming member 21 is adapted to provide a second magnetic circuit (shown in FIG. 5) which does not include the inner circumferential side of the coil 22. The second magnetic circuit forming number 21 forms a second magnetic circuit with the permanent magnet M and the pulsar ring 11 in such a manner that the magnetic resistance of the second magnetic circuit is even smaller than that of the first magnetic circuit formed by the first magnetic circuit forming member 20 when the first magnetic circuit forming member 20 is located in the second position relative to the pulsar ring 11.

The second magnetic circuit forming member 21 has a ring portion 21a and a plurality of teeth 21b. The ring portion 21a is disposed between the coil 22 and the S-pole of the permanent magnet M. The teeth 21b are formed along the circumferential portion of the ring portion 21a and extend radially outwardly. As shown in FIG. 2, the teeth 21b are disposed at equally spaced apart distances in the circumferential direction of the ring portion 21a. The number of teeth 21 on the second magnetic circuit forming member 21 is equal to the number of wall portions 11b of the pulsar ring 11. The teeth 21b are shifted relative to the teeth 20b of the first magnetic circuit forming member 20 in the circumferential direction of the ring portion 21a by a half pitch. As a result, each tooth 21b of the second magnetic circuit forming member opposes a wall portion 11b of the pulsar ring 11 when the teeth 20b of the first magnetic circuit forming member 20 are located in the second position relative to the pulsar ring 11. However, the teeth 21b do not oppose one of the wall portions 11b when the teeth 20b of the first magnetic circuit forming member 20 are located in the first position relative to the pulsar ring 11. Each wall portion 11b of the pulsar ring 11 extends in the axial direction of the pulsar ring 11 from a position corresponding to one of the teeth 20b to a position corresponding to one of the teeth 21b.

The yoke 25 contacts the N-pole of the permanent magnet M and is adapted to form the first and second magnetic circuits together with the first and second magnetic circuit forming members 20, 21. The yoke 25 has an axially extending cylindrical portion 25a located at the outer circumferential side of the pulsar ring 11.

Figure 4:
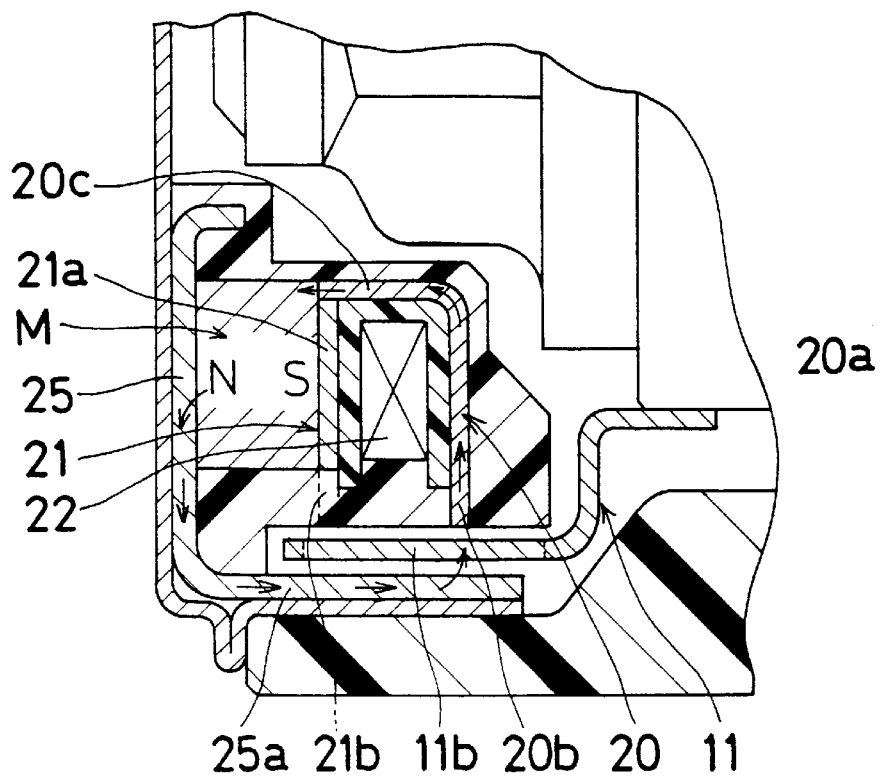
FIG. 4 is an enlarged cross-sectional view of a portion of the device shown in FIG. 1 showing the movement of the magnetic flux according to the first embodiment when the first magnetic circuit forming member is located in the first position relative to the pulsar ring.
Figure 5:
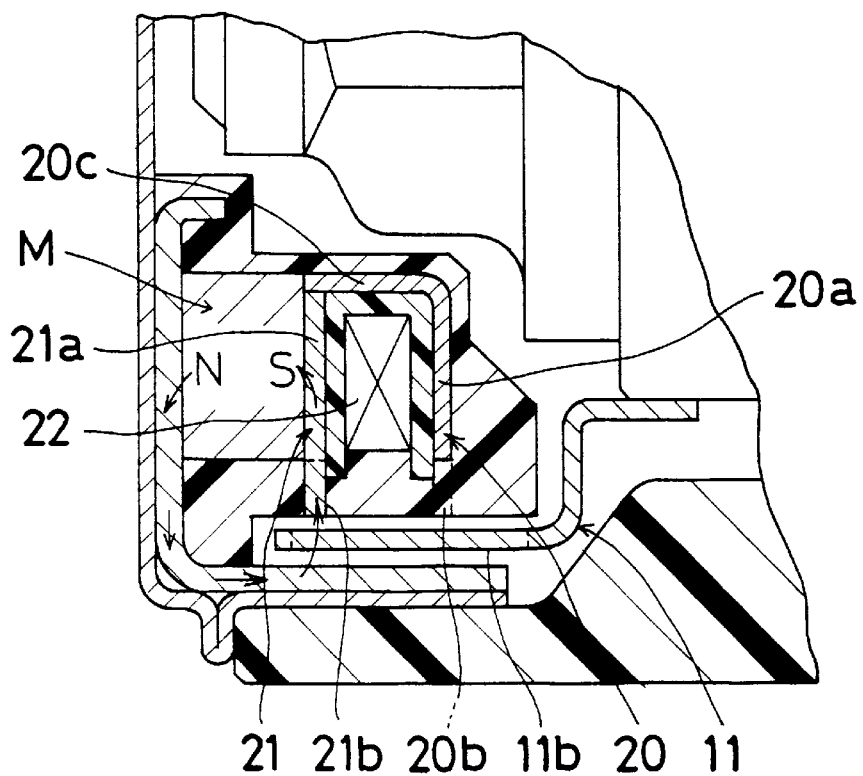
FIG. 5 is an enlarged cross-sectional view of a portion of the device shown in FIG. 1 showing the movement of the magnetic flux according to the first embodiment when the first magnetic circuit forming member is located in the second position relative to the pulsar ring.

Hereinafter, the operation of the above-described rotational speed sensing device will be explained with reference to FIG. 4 and FIG. 5.

If the rotating member 10 is rotated in one direction, the pulsar ring 11 rotates with the rotating member 10 so that the first magnetic circuit forming member 20 is alternately located relative to the pulsar ring 11 in a first position in which each tooth 20b of the first magnetic circuit forming member 20 opposes a wall portion 11b of the pulsar ring 11 and in a second position in which each tooth 20b does not oppose a wall portion 11b of the pulsar ring.

When the first magnetic circuit forming member 20 is located relative to the pulsar ring in the aforementioned first position, each tooth 21b of the second magnetic circuit forming member 21 does not oppose a wall portion 11b of the pulsar ring 11. As a result, the magnetic resistance between the teeth 21b and the wall portions 11b is higher than the magnetic resistance between the teeth 20b and the wall portions 11b. In other words, the magnetic resistance of the second magnetic circuit formed by the yoke 25, the pulsar ring 11 and the second magnetic circuit forming member 21 is even higher than the magnetic resistance of the first magnetic circuit formed by the yoke 25, the pulsar ring 11 and the first magnetic circuit forming member 20. Hence, as shown in FIG. 4, most of the magnetic flux generated by the N-pole of the permanent magnet M passes the inner circumferential side of the coil 22 and returns to the S-pole of the permanent magnet M.

On the other hand, when the first magnetic circuit forming member 20 is located relative to the pulsar ring 11 in the aforementioned second position, each tooth 21b of the second magnetic circuit forming member 21 opposes a wall portion 11b of the pulsar ring 11. As a result, the magnetic resistance between the teeth 21b and the wall portions 11b is lower than the magnetic resistance between the teeth 20b and the wall portions 11b. In other words, the magnetic resistance of the second magnetic circuit formed by the yoke 25, the pulsar ring 11 and the second magnetic circuit forming member 21 is even lower than the magnetic resistance of the first magnetic circuit formed by the yoke 25, the pulsar ring 11 and the first magnetic circuit forming member 20. Hence, as shown in FIG. 5 most of the magnetic flux generated by the N-pole of the permanent magnet M returns to the S-pole of the permanent magnet M without passing the inner circumferential side of the coil 22.

As described above, the magnetic flux which passes through the inner circumferential side of the coil 22 when the first magnetic circuit forming member 20 is located relative to the pulsar ring 11 in the second position is even smaller than the magnetic flux which passes through the inner circumferential side of the coil 22 when the first magnetic circuit forming member 20 is located relative to the pulsar ring 11 in the first position. The coil 22 generates voltage corresponding to the magnetic flux which passes through the inner circumferential side of the coil 22 and the voltage is picked up by the terminals 26a, 26b so that the rotational speed of the rotating member 10 can be detected.

Figure 9:
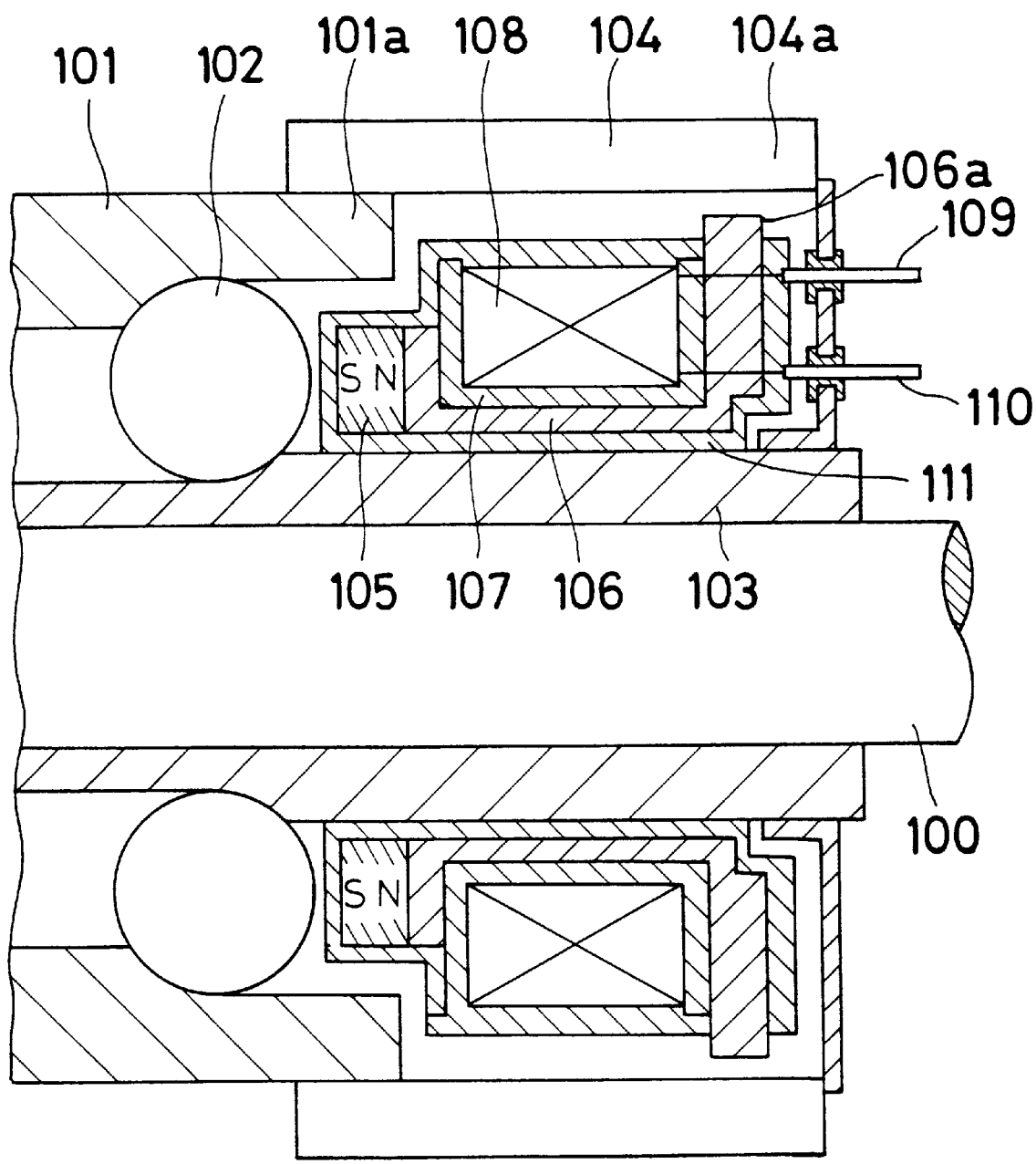
FIG. 9 is a cross-sectional view of a conventional rotational speed sensing device.
Figure 10:
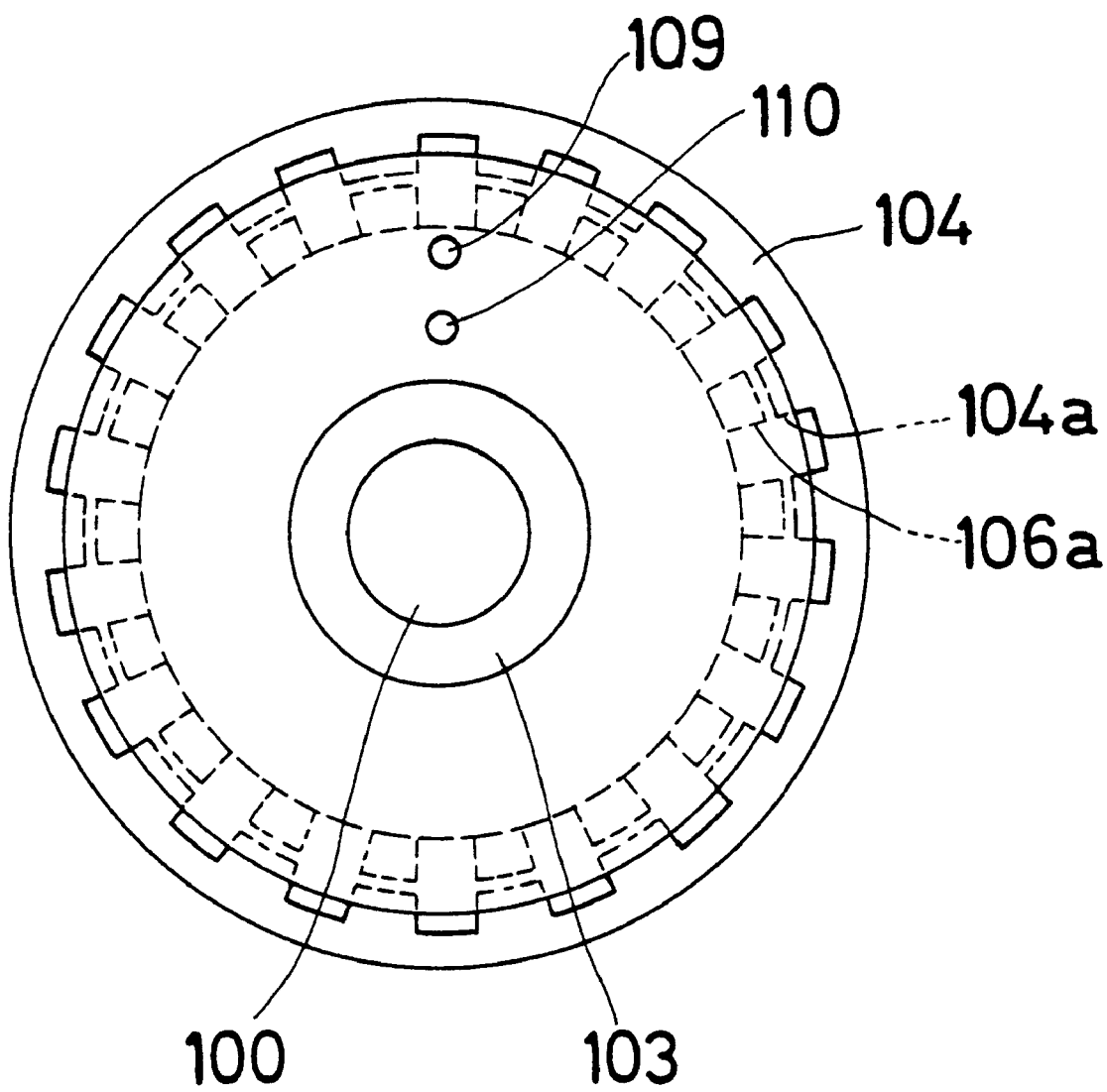
FIG. 10 is a side view of a portion of the device shown in FIG. 9 showing the relationship between a magnetic circuit forming member and the pulsar ring in FIG. 9.

Thus, in the first embodiment, the second magnet circuit forming member 21 is disposed between the permanent magnet M and the coil 22, and has teeth 21b shifted in the circumferential direction relative to the teeth 20b by a half pitch. As a result, the difference between the magnetic flux which passes through the inner circumferential side of the coil 22 when the first magnetic circuit forming member 20 is located in the first position relative to the pulsar ring 11 and the magnetic flux which passes through the inner circumferential side of the coil 22 when the first circuit forming member 20 is located in the second position relative to the pulsar ring 11 is even greater than that of the conventional device shown in FIG. 9 and FIG. 10. Hence, the output of the coil 22 can be larger without enlarging the permanent magnet M and increasing the number of turns of the coil 22.

Also, since the wall portions 11b of the pulsar ring 11 extend in the axial direction of the pulsar ring 11 from a position corresponding to each tooth 20b to a position corresponding to each tooth 21b, it is easy to form the wall portions 11b.

Additionally, since the permanent magnet M is comprised of a pair of magnet pieces spaced in the circumferential direction, the permanent magnet M can be prevented from cracking by a contraction force in solidification while the permanent magnet M, the coil 21 are bee magnetic circuit forming members 20, 21 are being formed integrally with the housing 28. Also, the terminals 26a, 26b can be connected to the coil 22 easily through a space formed between the magnet pieces 26a, 25b.

Figure 6:
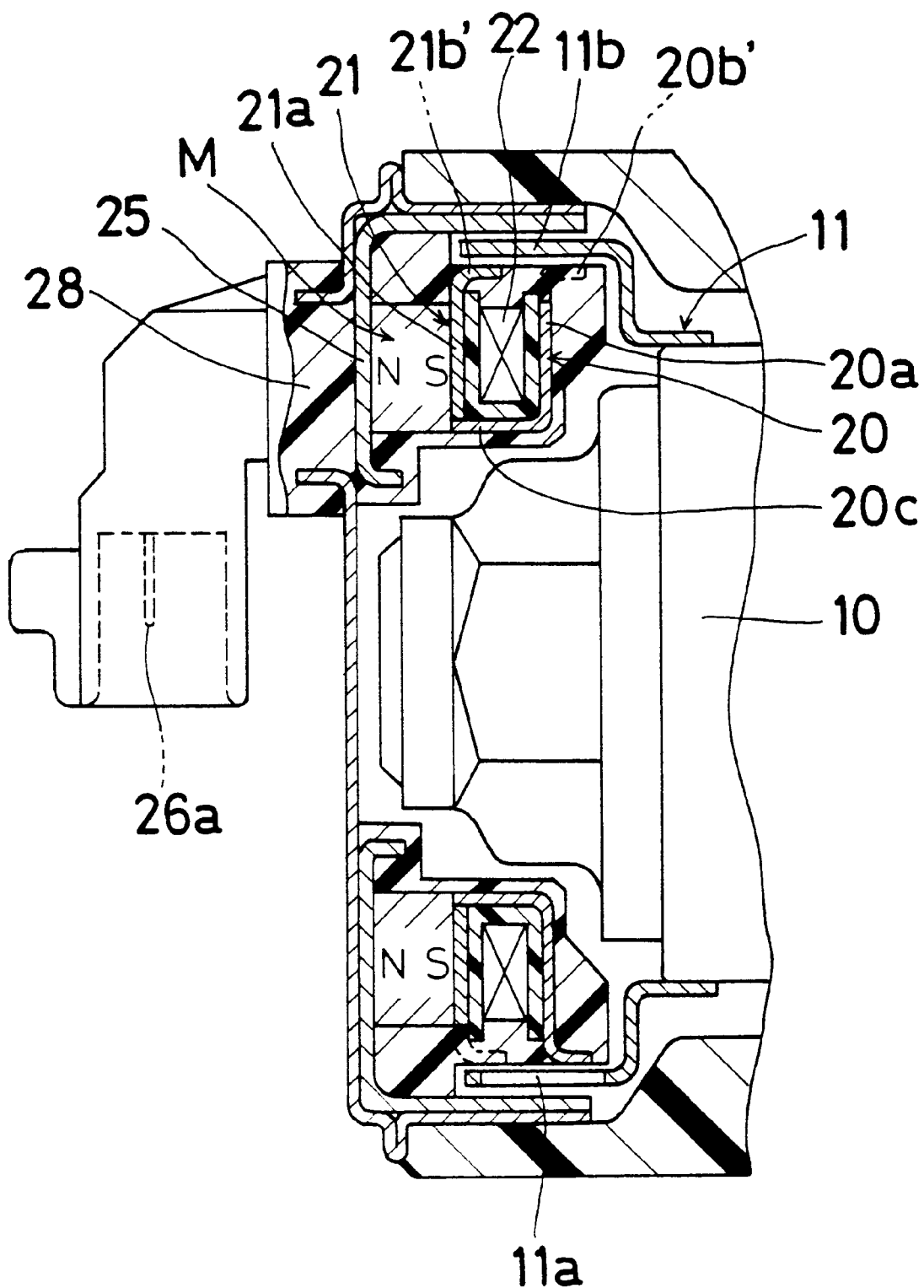
FIG. 6 is a cross-sectional view of a rotational speed sensing device according to a second embodiment of the present invention.

A rotational speed sensing device according to a second embodiment of the invention is explained with reference to FIG. 6. The rotational speed sensing device has the same fundamental structure as that of the first embodiment, but differs from that of the first embodiment in the structure of the teeth 20b, 21b. As shown in FIG. 6, a bent portion 20b' is formed at the top of each tooth 20b and a bent portion 21b'' is formed at the top of each tooth 21b. Thus, a plurality of bent portions 20b' are circumferentially disposed along the first magnetic circuit forming member 20 at positions corresponding to the teeth 20b, and a plurality of bent portions 21b' are circumferentially disposed along the second circuit forming 20 at positions corresponding to the teeth 21b. The bent portions 20b', 21b' are disposed parallel with the wall portions 11b of the pulsar ring 11 to increase the opposing area of the teeth 20b, 21b with respect to the wall portions 11b. This embodiment of the rotational speed sensing device operates in the same manner as the first embodiment.

In the second embodiment, since the bent portions 20b' are formed at the top of the teeth 20b to increase the opposing area thereof with respect to the wall portions 11b, the magnetic resistance between the teeth 20b and the wall portions 11b is lower than that of the first embodiment. Also, since the bent portions 21b' are formed at the top of the teeth 21b to increase the opposing area thereof with respect to the wall portions 11b, the magnetic resistance between the teeth 21b and the wall portions 11b is lower than that of the first embodiment.

Figure 7:
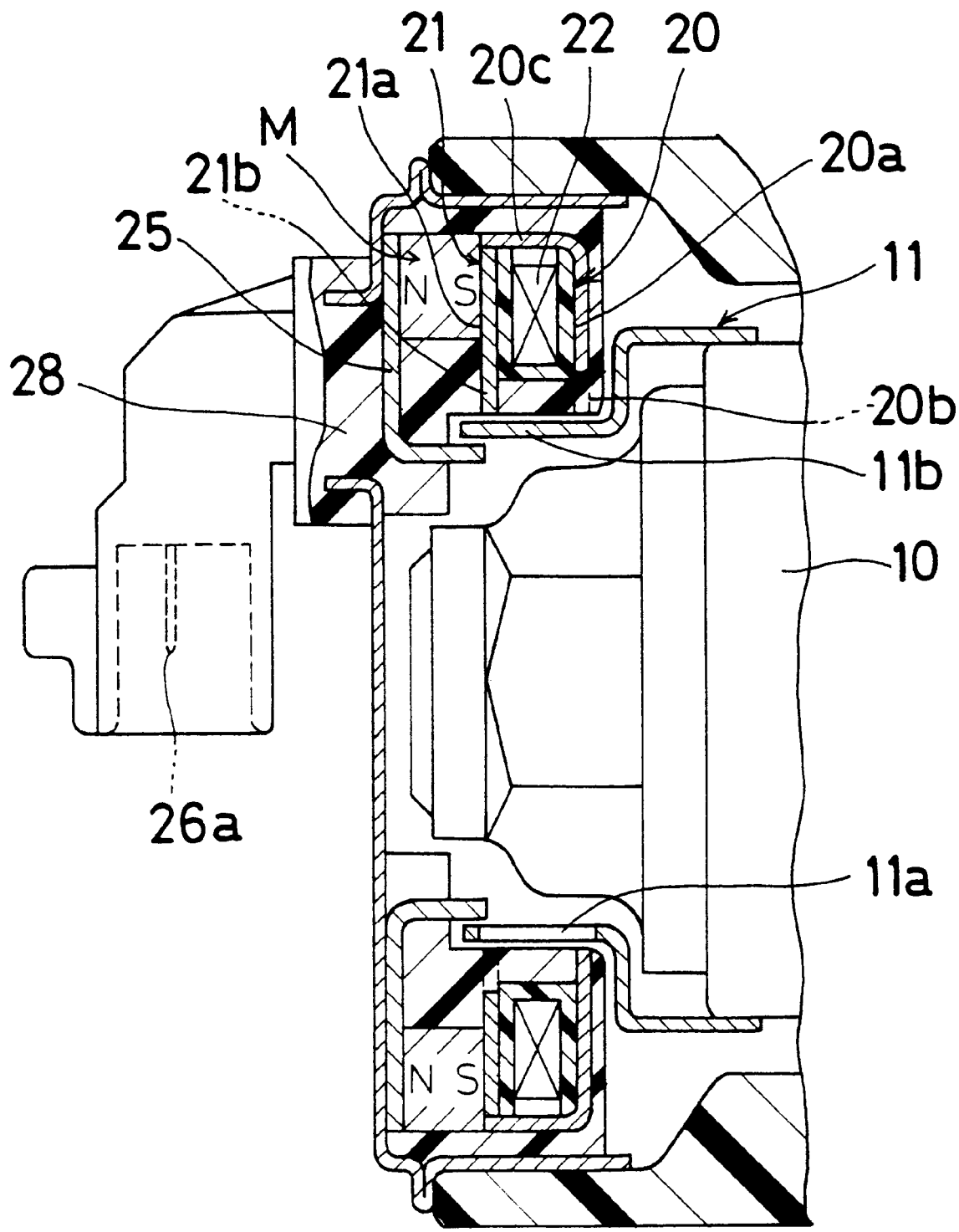
FIG. 7 is a cross-sectional view of a rotational speed sensing device according to a third embodiment of the present invention.

A rotational speed sensing device of the third embodiment is explained with reference to FIG. 7. The rotational speed sensing device has the same fundamental structure as that of the first embodiment, but differs from that of the first embodiment in the following manner. As shown in FIG. 7, the coil 22, the first magnetic circuit forming member 20 and the second magnetic circuit forming member 21 are disposed at the outer circumferential side (i.e., radially outwardly) of the wall portions 11b of the pulsar ring 11. The teeth 20b are formed at the inner circumferential portion of the ring portion 20a and the teeth 21b are formed at the inner circumferential portion of the ring portion 21a.

During rotation of the pulsar ring 11, each tooth 20b is alternately disposed relative to the pulsar ring 11 in the first position in which each tooth 20b opposes a wall portion 11b and in the second position in which each tooth 20b does not oppose a wall portion 11b. The teeth 21b do not oppose a wall portion 11b when the teeth 20b are located in the first position relative to the pulsar ring 11 and the teeth 21b oppose a wall portion 11b when the teeth 20b are located in the second position relative to the pulsar ring 11. The cylindrical portion 20c extends from the outer circumferential portion of the ring portion 20a through the outer circumferential side of the coil 22 in the axial direction of the rotating member 10. The rotational speed sensing device in accordance with this embodiment of the invention operates in the same manner as the first embodiment.

Figure 8:
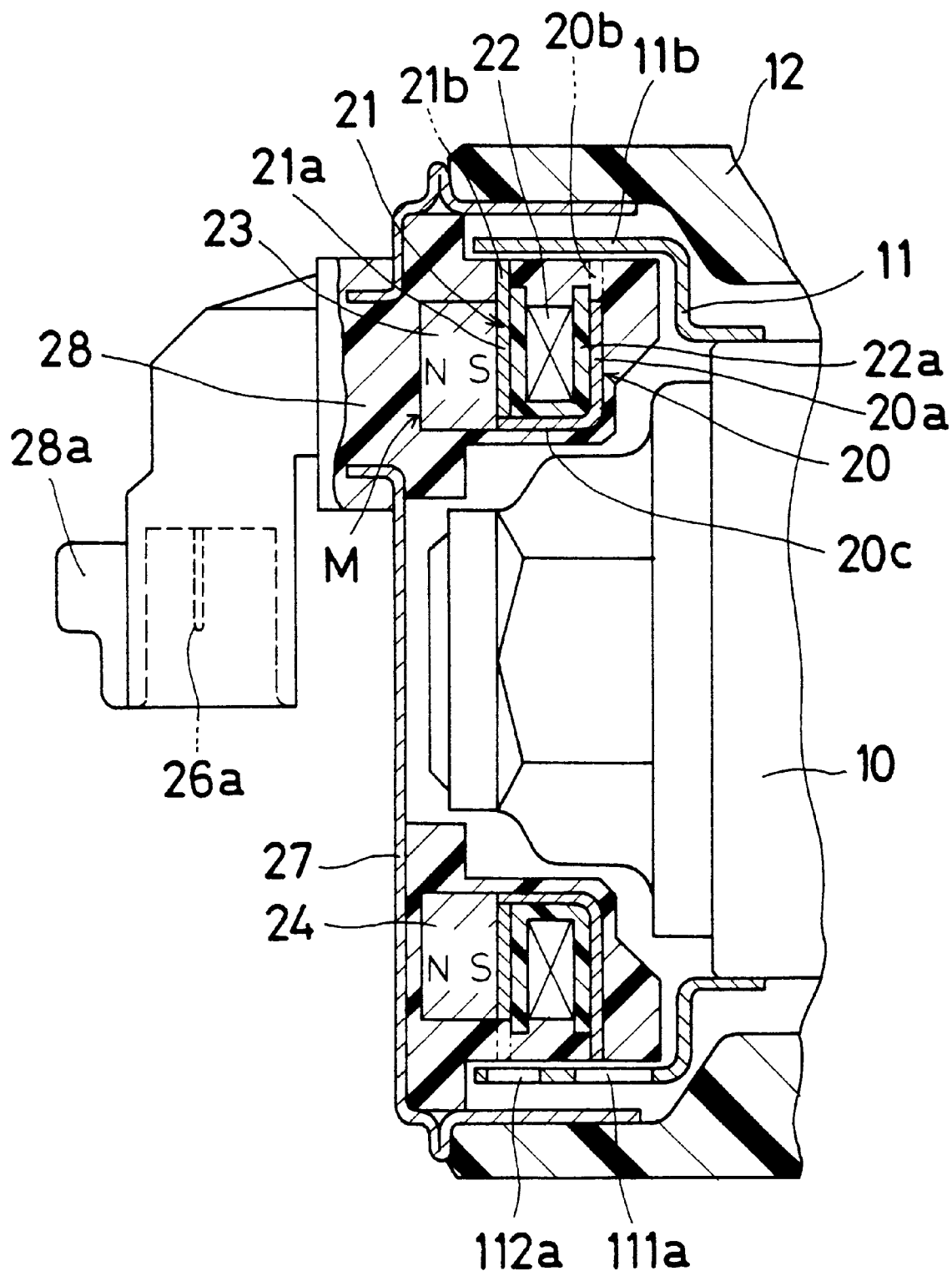
FIG. 8 is a cross-sectional view of a rotational speed sensing device according to a fourth embodiment of the present invention.

A rotational speed sensing device according to a fourth embodiment of the present invention is explained with reference to FIG. 8. The rotational speed sensing device of this embodiment has the same fundamental structure as that of the first embodiment, but differs from that of the first embodiment in the following manner. As shown in FIG. 8, the yoke 25 is omitted. Each hole 11a of the pulsar ring 11 is separated in the axial direction of the pulsar ring 11 at a substantially center or central position between each tooth 20b and each tooth 21b. As a result, a plurality of first holes 111a are formed at a position of the pulsar ring 11 corresponding to the teeth 20b and a plurality of second holes 112a are formed at a position of the pulsar ring 11 corresponding to the teeth 21b. It is to be noted that in the first, second and third embodiments, the holes 11a may be separated in the axial direction in a manner similar to that associated with the fourth embodiment. The rotational speed sensing device according to the fourth embodiment operates in the same manner as the first embodiment.

In the embodiments described above, the teeth 20b, 21b need not be shifted in the circumferential direction with respect to each other. In this case, the first wall portions of the pulsar ring 11 can be disposed at equally spaced apart distances at a portion of the pulsar ring 11 corresponding to the teeth 20b and the second wall portions of the pulsar ring 11 can be disposed at equally spaced apart distances at a portion of the pulsar ring 11 corresponding to the teeth 21b. Also, the first and second wall portions are shifted in the circumferential direction of the pulsar ring 11 by half a pitch with respect to each other.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes, and equivalents which fall within the spirit and scope of the present invention as defined in the claims, be embraced thereby.

What is claimed is:

1. A rotational speed sensing device for sensing rotational speed of a rotating member comprising:

a pulsar ring fixed to the rotating member, said pulsar ring having a plurality of spaced apart wall portions disposed along a circumferential direction of the pulsar ring and a plurality of holes each disposed between adjacent pairs of wall portions;

a permanent magnet having an N-pole for generating magnetic flux and an S-pole for receiving magnetic flux generated by the N-pole;

a coil disposed adjacent the pulsar ring for generating voltage corresponding to magnetic flux passing through an inner side of the coil in an axial direction of the rotating member;

a first magnetic member for forming a first magnetic circuit with the permanent magnet, the pulsar ring and the inner side of the coil, the first magnetic member having a plurality of projections and the first magnetic member being alternately disposed relative to the pulsar ring during rotation of the pulsar ring in a first position and in a second position so that in the first position the distance between each projection and a respective wall portion of the pulsar ring is greater than the distance between each projection and the respective wall portion in the second position; and a second magnetic member for forming a second magnetic circuit with the permanent magnet and the pulsar ring in such a manner that when the first magnetic member is disposed relative to the pulsar ring in the first position a magnetic resistance of the second magnetic circuit is lower than a magnetic resistance of the first magnetic circuit, the second magnetic member being disposed between the permanent magnet and the coil, said second magnetic member having a plurality of projections that are circumferentially shifted relative to the projections of the first magnetic member by substantially one-half pitch, each hole in the pulsar ring being separated in an axial direction of the pulsar ring into two hole portions at a substantially center position between the first and second magnetic members.

2. A rotational speed sensing device as set forth in claim 1, wherein the plurality of projections of the second magnetic member each oppose one of the wall portions of the pulsar ring when the first magnetic member is located in the second position relative to the pulsar ring.

3. A rotational speed sensing device as set forth in claim 2, wherein the projections of the second magnetic member are equal in number to the number of wall portions of the pulsar ring.

4. A rotational speed sensing device as set forth in claim 3, wherein each wall portion of the pulsar ring extends in an axial direction of the pulsar ring from a position corresponding to one of the projections of the first magnetic to a position corresponding to one of the projections of the second magnetic member.

5. A rotational speed sensing device as set forth in claim 2, wherein each projection of the second magnetic member is provided with a bent portion to increase an area of the projections which oppose the wall portions of the pulsar ring.

6. A rotational speed sensing device as set forth in claim 1, wherein the permanent magnet is comprised of a plurality of circumferentially spaced magnet pieces.

7. A rotational speed sensing device as set forth in claim 1, wherein the coil is disposed radially inwardly of the wall portions of the pulsar ring.

8. A rotational speed sensing device as set forth in claim 1, wherein the coil is disposed radially outwardly of the wall portions of the pulsar ring.

9. A rotational speed sensing device for sensing rotational speed of a rotating member comprising:

a pulsar ring fixed to the rotating member, said pulsar ring having a plurality of equally spaced apart and circumferentially arranged wall portions and a plurality of holes each disposed between adjacent pairs of wall portions;

a permanent magnet having an N-pole for generating magnetic flux and an S-pole for receiving magnetic flux generated by the N-pole;

a coil disposed adjacent the pulsar ring for generating voltage corresponding to magnetic flux passing through an inner side of the coil in an axial direction of the rotating member;

a first magnetic member for forming a first magnetic circuit with the permanent magnet, the pulsar ring and the inner side of the coil, the first magnetic member having projections disposed so that during rotation of the pulsar ring, the projections and the pulsar ring are alternately disposed relative to one another in a first position in which each of a plurality of said projections opposes one of the wall portions of the pulsar ring and in a second position in which each of said plurality of projections is positioned other than in opposing relation to one of the wall portions of the pulsar ring; and a second magnetic member for forming a second magnetic circuit with the permanent magnet and the pulsar ring in such a manner that a magnetic resistance of the second magnetic circuit is lower than a magnetic resistance of the first magnetic circuit when the projections and plurality of wall portions are located in the second position relative to one another, the second magnetic member being disposed between the permanent magnet and the coil, said second magnetic member having a plurality of projections that are circumferentially shifted relative to the projections of the first magnetic member by substantially one-half pitch, each hole in the pulsar ring being separated in an axial direction of the pulsar ring into two hole portions at a substantially center position between the first and second magnetic members.

10. A rotational speed sensing device as set forth in claim 9, wherein the coil is disposed radially inwardly of the wall portions of the pulsar ring.

11. A rotational speed sensing device as set forth in claim 9, wherein the coil is disposed radially outwardly of the wall portions of the pulsar ring.

12. A rotational speed sensing device for sensing rotational speed of a rotatable member, comprising:

a pulsar ring secured to the rotatable member for rotating with the rotatable member, the pulsar ring including a plurality of spaced apart wall portions along a circumferential direction of the pulsar ring and a plurality of holes each disposed between adjacent pairs of wall portions;

a permanent magnet having an N-pole for generating magnetic flux and an S-pole for receiving magnetic flux;

a coil disposed adjacent the pulsar ring for generating a voltage corresponding to magnetic flux passing through an inner side of the coil in an axial direction of the rotating member;

a first magnetic circuit forming member positioned on one side of the coil for forming a first magnetic circuit with the permanent magnet, the pulsar ring and the inner side of the coil, said first magnetic circuit forming member including a plurality of spaced apart projections;

a second magnetic circuit forming member positioned on a side of the coil opposite the first magnetic circuit forming member for forming a second magnetic circuit with the permanent magnet and the pulsar ring, the second magnetic circuit forming member including a plurality of spaced apart projections that are circumferentially shifted relative to the projections of the first magnetic circuit forming member by substantially one-half pitch, the projections on the first and second magnetic circuit forming members interacting with portions of the pulsar ring so that during rotation of the pulsar ring the position of the pulsar ring relative to the first magnetic circuit forming member alternates between one position in which a magnetic resistance of the second magnetic circuit is lower than a magnetic resistance of the first magnetic circuit and another position in which the magnetic resistance of the second magnetic circuit is greater than the magnetic resistance of the first magnetic circuit, the second magnetic circuit forming member being disposed between the permanent magnet and the coil, each hole in the pulsar ring being separated in an axial direction of the pulsar ring into two hole portions at a substantially center position between the first and second magnetic circuit forming members.

13. A rotational speed sensing device as set forth in claim 1, wherein the second magnetic circuit does not pass through the inner side of the coil.

14. A rotational speed sensing device as set forth in claim 9, wherein the second magnetic circuit does not pass through the inner side of the coil.

15. A rotational speed sensing device as set forth in claim 10, wherein the second magnetic circuit does not pass through the inner side of the coil.

16. A rotational speed sensing device for sensing rotational speed of a rotating member comprising:

a pulsar ring adapted to be fixed to the rotating member, said pulsar ring having a plurality of spaced apart wall portions disposed along a circumferential direction of the pulsar ring;

a permanent magnet having a N-pole and a S-pole;

a coil disposed adjacent the pulsar ring for generating voltage corresponding to magnetic flux passing through an inner side of the coil in an axial direction of the rotating member;

a first magnetic member for forming a first magnetic circuit with the permanent magnet, the pulsar ring and the inner side of the coil, the first magnetic member having a plurality of projections and the first magnetic member being alternately disposed relative to the pulsar ring during rotation of the pulsar ring in a first position and in a second position so that in the first position the distance between each projection and a respective wall portion of the pulsar ring is greater than the distance between each projection and the respective wall portion of the pulsar ring in the second position;

a second magnetic member for forming with the permanent magnet and the pulsar ring a second magnetic circuit which is different from the first magnetic circuit, said second magnetic member being separated from the first magnetic member, a magnetic resistance of the second magnetic circuit being lower than a magnetic resistance of the first magnetic circuit when the first magnetic member is disposed relative to the pulsar ring in the first position, said second magnetic member being disposed between the permanent magnet and the coil; and a housing made of resin material and integrally accommodating the first and second magnetic members.

17. A rotational speed sensing device for sensing rotational speed of a rotating member comprising:

a pulsar ring adapted to be fixed to the rotating member, said pulsar ring having a plurality of spaced apart wall portions disposed along a circumferential direction of the pulsar ring;

a permanent magnet having a N-pole and a S-pole;

a coil disposed adjacent the pulsar ring for generating voltage corresponding to magnetic flux passing through an inner side of the coil in an axial direction of the rotating member;

a first magnetic member for forming a first magnetic circuit with the permanent magnet, the pulsar ring and the inner side of the coil, the first magnetic member having a plurality of projections and the first magnetic member being alternately disposed relative to the pulsar ring during rotation of the pulsar ring in a first position and in a second position so that in the first position the distance between each projection and a respective wall portion of the pulsar ring is greater than the distance between each projection and the respective wall portion of the pulsar ring in the second position;

a second magnetic member for forming with the permanent magnet and the pulsar ring a second magnetic circuit which is different from the first magnetic circuit, a magnetic resistance of the second magnetic circuit being lower than a magnetic resistance of the first magnetic circuit when the first magnetic member is disposed relative to the pulsar ring in the first position, said second magnetic member being disposed between the permanent magnet and the coil, said second magnetic member having a plurality of projections that are circumferentially shifted relative to the projections of the first magnetic member, the plurality of projections of the second magnetic member each opposing one of the wall portions of the pulsar ring when the first magnetic member is located in the second position relative to the pulsar ring; and a housing made of resin material and integrally accommodating the first and second magnetic members.

18. A rotational speed sensing device as set forth in claim 17, wherein each wall portion of the pulsar ring extends in an axial direction of the pulsar ring from a position corresponding to one of the projections of the first magnetic member to a position corresponding to one of the projections of the second magnetic member.

19. A rotational speed sensing device for sensing rotational speed of a rotating member rotatably supported by a hub fixed to a body of the vehicle comprising:

a pulsar ring adapted to be fixed to the rotating member, said pulsar ring having a plurality of spaced apart wall portions disposed along a circumferential direction of the pulsar ring and a plurality of holes each disposed between adjacent pairs of wall portions;

a permanent magnet having a N-pole and a S-pole;

a coil disposed adjacent the pulsar ring for generating voltage corresponding to magnetic flux passing through an inner side of the coil in an axial direction of the rotating member;

a first magnetic member for forming a first magnetic circuit with the permanent magnet, the pulsar ring and the inner side of the coil, the first magnetic member having a plurality of projections and the first magnetic member being alternately disposed relative to the pulsar ring during rotation of the pulsar ring in a first position and in a second position so that in the first position the distance between each projection and a respective wall portion of the pulsar ring is greater than the distance between each projection and the respective wall portion of the pulsar ring in the second position;

a second magnetic member for forming with the permanent magnet and the pulsar ring a second magnetic circuit which is different from the first magnetic circuit, the second magnetic member being separated from the first magnetic member, a magnetic resistance of the second magnetic circuit being lower than a magnetic resistance of the first magnetic circuit when the first magnetic member is disposed relative to the pulsar ring in the first position, said second magnetic member being disposed between the permanent magnet and the coil; and a housing fixed to the hub and accommodating the permanent magnet, the coil, the first magnetic member and the second magnetic member.

20. A rotational speed sensing device for sensing rotational speed of a rotating member rotatable supported by a hub fixed to a body of the vehicle comprising:

a pulsar ring adapted to be fixed to the rotating member, said pulsar ring having a plurality of spaced apart wall portions disposed along a circumferential direction of the pulsar ring and a plurality of holes each disposed between adjacent pairs of wall portions;

a permanent magnet having a N-pole and a S-pole;

a coil disposed adjacent the pulsar ring for generating voltage corresponding to magnetic flux passing through an inner side of the coil in an axial direction of the rotating member;

a first magnetic member for forming a first magnetic circuit with the permanent magnet, the pulsar ring and the inner side of the coil, the first magnetic member having a plurality of projections and the first magnetic member being alternately disposed relative to the pulsar ring during rotation of the pulsar ring in a first position and in a second position so that in the first position the distance between each projection and a respective wall portion of the pulsar ring is greater than the distance between each projection and the respective wall portion of the pulsar ring in the second position;

a second magnetic member for forming with the permanent magnet and the pulsar ring a second magnetic circuit which is different from the first magnetic circuit, a magnetic resistance of the second magnetic circuit being lower than a magnetic resistance of the first magnetic circuit when the first magnetic member is disposed relative to the pulsar ring in the first position, said second magnetic member being disposed between the permanent magnet and the coil, said second magnetic member having a plurality of projections that are circumferentially shifted relative to the projections of the first magnetic, the plurality of projections of the second magnetic member each opposing one of the wall portions of the pulsar ring when the first magnetic member is located in the second position relative to the pulsar ring, each wall portion of the pulsar ring extending in an axial direction of the pulsar ring from a position corresponding to one of the projections of the first magnetic member to a position corresponding to one of the projections of the second magnetic member; and a housing fixed to the hub and accommodating the permanent magnet, the coil, the first magnetic member and the second magnetic member.

* * * * *

UNITED STATES PATENT AND TRADEMARK OFFICE
CERTIFICATE OF CORRECTION

PATENT NO. : 5,905,375
DATED : May 18, 1999
INVENTOR(S) : Shirai et al.

It is certified that error appears in the above-identified patent and that said Letters Patent is hereby corrected as shown below:

ON THE TITLE PAGE
Item [56], please insert:

FOREIGN PATENT OR PUBLISHED FOREIGN PATENT APPLICATION

| | | DOCUMENT NUMBER | PUBLICATION DATE | COUNTRY OR PATENT OFFICE | CLASS | SUBCLASS | TRANSLATION YES | NO |
|---|---|---|---|---|---|---|---|---|
| | | 880766 | 10/1961 | GREAT BRITAIN | | | | |
| | | 880767 | 10/1961 | GREAT BRITAIN | | | | |
| | | | | | | | | |

Signed and Sealed this

Tenth Day of October, 2000

Attest:

Attesting Officer

Q. TODD DICKINSON
Director of Patents and Trademarks